United States Patent [19]

Jeremias

[11] Patent Number: 4,480,952
[45] Date of Patent: Nov. 6, 1984

[54] NON-BURRING DRILL FOR COMPOSITE MATERIALS

[76] Inventor: Robert W. Jeremias, 1934 N. Vermont, Royal Oak, Mich. 48073

[21] Appl. No.: 308,712

[22] Filed: Oct. 5, 1981

[51] Int. Cl.³ .................. B23B 51/00; B23B 51/08
[52] U.S. Cl. ................... 408/224; 408/1 R; 408/228
[58] Field of Search .......... 408/22, 21, 20, 30, 408/1, 211–214, 36, 223–231, 241 R, 79–83, 190–194, 199, 713; 144/241, 218, 219; 29/432, 558; 83/578, 688

[56] References Cited

U.S. PATENT DOCUMENTS

| | | | |
|---|---|---|---|
| 309,868 | 12/1884 | Olson | 408/213 |
| 387,448 | 8/1888 | Richards | 408/213 |
| 1,017,352 | 2/1912 | Wagner . | |
| 1,047,466 | 12/1912 | Wagner . | |
| 1,881,024 | 10/1932 | Lang . | |
| 2,334,845 | 11/1943 | Schwartz | 408/224 |
| 2,732,869 | 1/1956 | Stearns | 408/224 |
| 2,746,722 | 5/1956 | Schneider | 408/226 |
| 2,777,342 | 1/1957 | Fried . | |
| 2,962,066 | 11/1960 | Deliso | 408/226 |
| 2,977,828 | 4/1961 | Strickland . | |
| 3,022,686 | 2/1962 | Rowley . | |
| 3,122,947 | 3/1964 | Cogsdill . | |
| 3,191,700 | 6/1965 | McKenna . | |
| 3,564,948 | 2/1971 | Pomernacki . | |
| 3,592,555 | 7/1971 | Mackey . | |
| 3,667,768 | 6/1972 | Stokey . | |
| 3,940,214 | 2/1976 | Waschek . | |
| 3,997,279 | 12/1976 | Porter . | |
| 4,032,251 | 6/1977 | Ribich . | |
| 4,043,698 | 8/1977 | Chelberg . | |
| 4,050,841 | 9/1977 | Hildebrandt | 408/213 |
| 4,066,379 | 1/1978 | Prohaska . | |
| 4,078,621 | 3/1978 | Dewar et al. . | |
| 4,079,766 | 3/1978 | Conley et al. . | |
| 4,086,018 | 4/1978 | Robinson et al. . | |
| 4,093,395 | 6/1978 | Luebbert . | |
| 4,095,491 | 6/1978 | Hildebrandt . | |
| 4,312,610 | 1/1982 | Burt | 408/30 |

FOREIGN PATENT DOCUMENTS 538218 3/1957 Canada .
80109 1/1951 Czechoslovakia ............ 408/224

OTHER PUBLICATIONS

"Spade Drills for High Production", Butrick, American Machinist, Apr. 17, 1972.

Primary Examiner—Leonidas Vlachos
Assistant Examiner—Jerry Kearns

[57] ABSTRACT

A drill for fiber filled composite materials which has a relatively blunt tip portion for initiating a hole in the workpiece, followed by an acute reaming portion for enlarging the initial hole with minimal breakout followed by a circular rear-facing cutting edge for removing fibers projecting from the walls of the hole upon retracting the drill through the hole.

9 Claims, 5 Drawing Figures

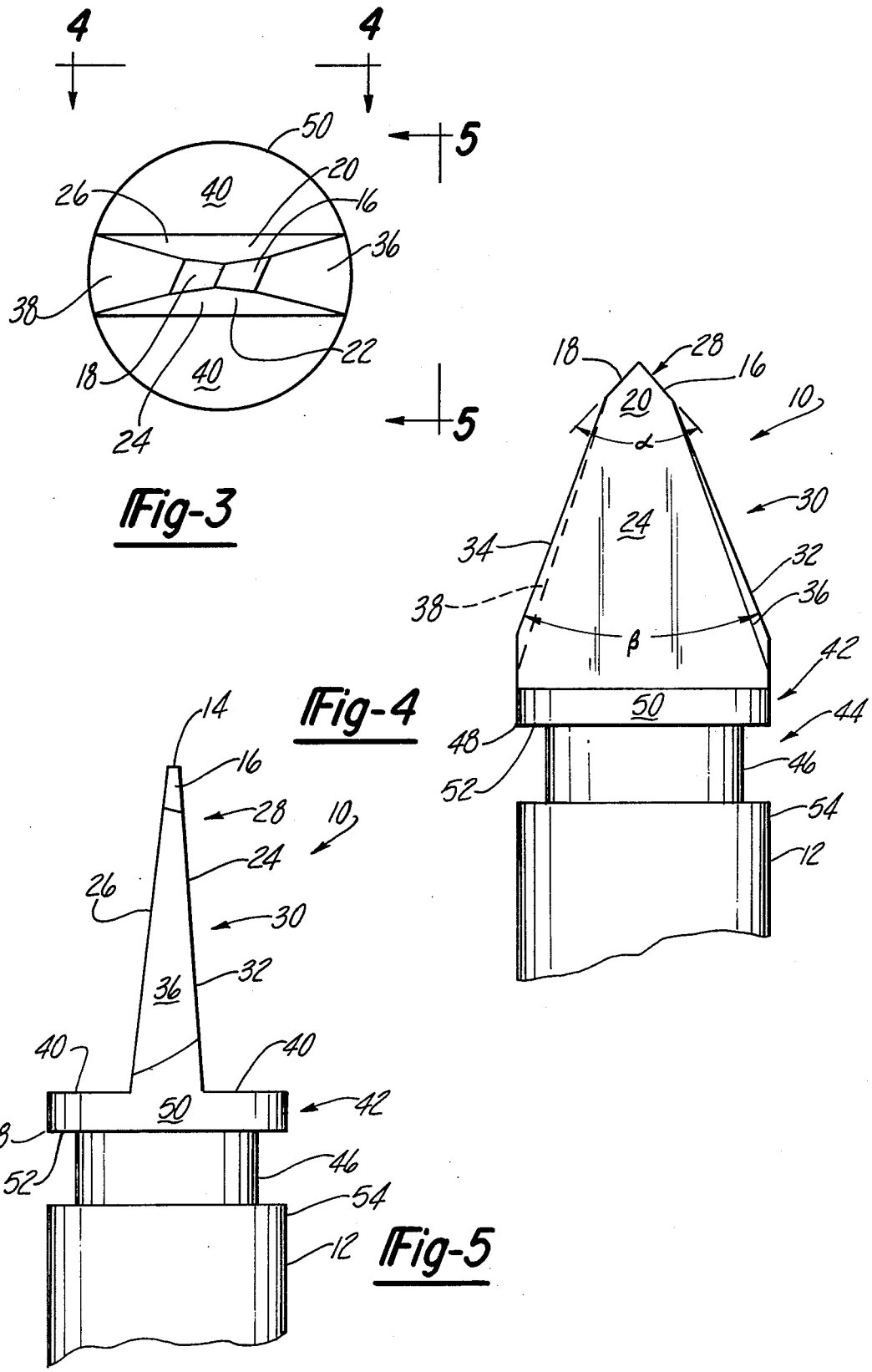

NON-BURRING DRILL FOR COMPOSITE MATERIALS

The Iron Age is Ending. Composite materials are rapidly replacing ferrous metals in automotive and aerospace applications where high strength and low weight are essential. Glass fiber filled composites are being promoted for control surfaces of aircraft, exterior surfaces for automobiles and even in leaf springs. While these new materials are enabling designers to enjoy vastly improved material properties, they are creating new and difficult problems for the engineers and production line workers who have to form these materials into the desired shapes. For example, if the design calls for a hole through a glass fiber filled composite, a conventional twist drill will not ordinarily form a satisfactory hole with smooth interior walls and undisturbed lateral surfaces adjacent to the holes if the resin which bonds the fibers together is hard and brittle. Instead, surface damage and cracks are often found on the lateral surface extending from the wall of the hole to locations as much as one hole diameter away from the hole. This is often called "breakout". In addition, the fibers which fill the composite are often not sheared off but remain projecting from the interior walls of the hole. These are called "hairs" or "burrs". The drill of the present invention is capable of drilling holes in many composite materials with minimal breakout leaving only small numbers of hairs remaining after the drilling process has been completed. It is suited to drilling composites having hard brittle resins filled with fibers of considerable tensile strength. These benefits are obtained by a drill having a relatively blunt tip portion, a relatively acute reaming portion and means for shearing off hairs including a large cylindrical portion having the same radius as the hole to be drilled and a portion of reduced diameter following and adjoining the large cylindrical portion. A cutting edge is formed rearward of the large cylindrical portion by the juncture of the periphery of the large cylindrical portion and an adjacent annular surface between the periphery of the large cylindrical portion and the reduced portion. After the drill has formed a hole in the composite material, the large cylindrical portion is passed completely through the material and the hairs or uncut fibers spring into the space left by the reduced portion. Upon withdrawal of the drill, many, if not most, or all, of these hairs are sheared off by the cutting edge at the rear of the large cylindrical portion.

DESCRIPTION OF PRIOR ART

Applicant is aware of the following items of prior art:

| U.S. PAT. NO. | |
| --- | --- |
| 4,095,491 | Hildebrandt |
| 4,093,395 | Luebbert et al. |
| 4,086,018 | Robinson et al. |
| 4,079,766 | Conley et al. |
| 4,078,621 | Dewar et al. |
| 4,066,379 | Prohaska |
| 4,043,698 | Chelberg |
| 4,032,251 | Ribich |
| 3,997,279 | Porter |
| 3,940,214 | Waschek |
| 3,667,768 | Stokey |
| 3,592,555 | Mackey, Sr. |
| 3,564,948 | Pomernacki |
| 3,191,700 | McKenna |
| 3,122,947 | Cogsdill |
| 3,022,686 | Rowley |
| 2,977,828 | Strickland |
| 2,777,342 | Fried |
| 1,881,024 | Lang |
| 1,047,466 | Wagner |
| 1,017,352 | Wagner |
| FOREIGN PATENT | | |
| 538,218 | CANADA | Cummins |

OTHER PUBLICATIONS

*Spade Drills for High Production*, F. M. Butrick, American Machinist, Apr. 17, 1972 pp. 86–88.

BRIEF DESCRIPTION OF THE DRAWINGS

FIG. 3 is a view of the drill as seen from the end.

FIG. 4 is an elevation taken along line 4—4 in FIG. 3.

FIG. 5 is an elevation taken along line 5—5 in FIG. 3.

DESCRIPTION OF THE PREFERRED EMBODIMENT

Figure 1:
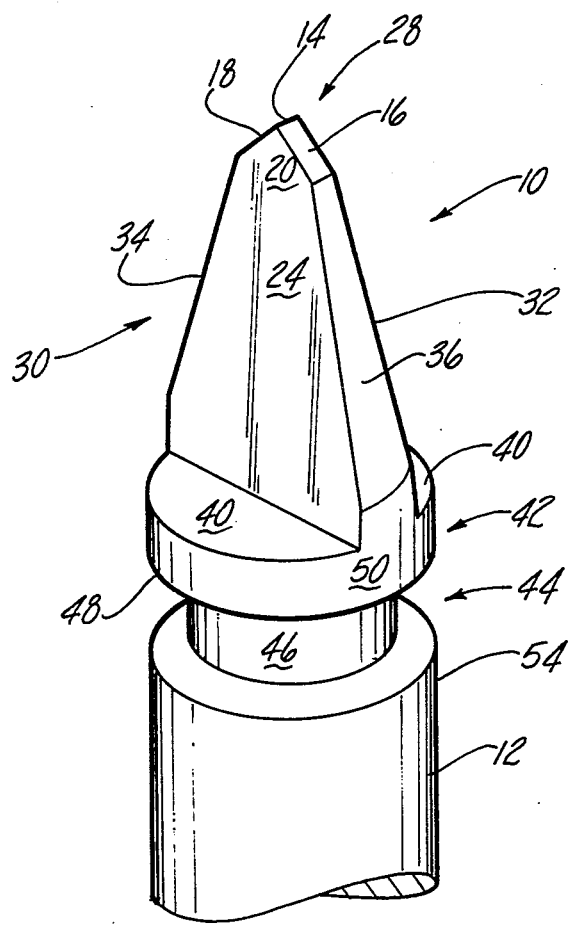
FIG. 1 is an isometric view illustrating the blade portion of the drill of the present invention.
Figure 2:
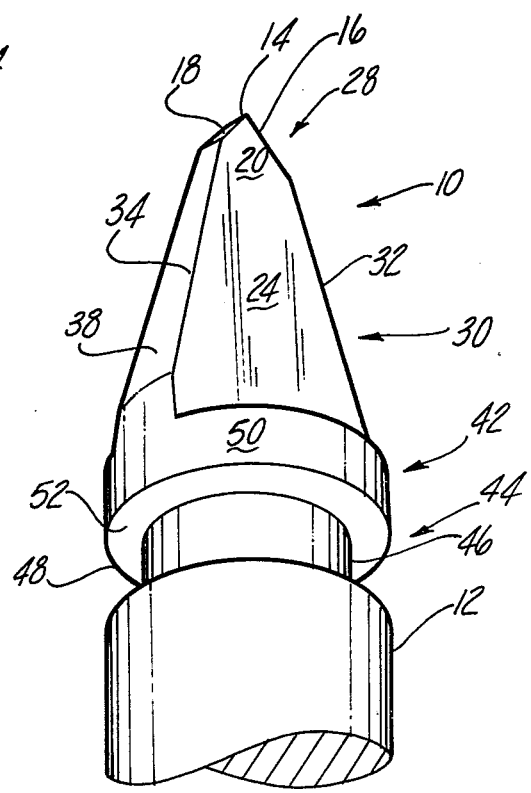
FIG. 2 is an isometric view illustrating the shearing portion of the drill of the present invention.

Drill head 10, which may be made of cemented carbide or other suitable cutting material such as high speed steel, is mounted on shank 12, preferably by brazing. Web tip 14 in conjunction with adjoining peripheral tip facets 16 and 18, and the upper portions 20 and 22 of lateral faces 24 and 26 define tip portion 28 of drill head 10. As best seen in FIG. 4, the tip angle $\alpha$ on lateral face 24 defined between tip facets 16 and 18 is optimally about 90°. While angles of between 60° and 120° are preferred, angles of as much as 135° and as small as 20° can be used. However, angles in the range of 20° result in a weaker construction.

Reaming portion 30 of drill head 10 adjoins and succeeds tip portion 28. The cutting or reaming action of reaming portion 30 is provided by reaming edges 32 defined by the intersection of lateral face 26 and peripheral facet 36, as well as reaming edge 34 defined by lateral face 24 and peripheral facet 38. As best shown in FIGS. 4 and 5, peripheral facet 36 is relieved behind reaming edge 32 for clearance and to eliminate peripheral rubbing. Typically a relief angle of about 15° is satisfactory. Similarly, peripheral facet 38 is relieved behind reaming edge 34. In order to reduce breakout, the reaming angle $\beta$ between cutting edges 32 and 34 is preferably around 40° although angles of from about 60° down to about 15° can be used. To obtain maximum reduction in breakout, the smaller angles are preferred, but the length of the drill must then be increased. So long as the angle $\alpha$ is larger than $\beta$ then there will be a tendency for the relatively acute reaming section to reduce breakout caused by the blunt tip. A difference of about 50° between $\alpha$ and $\beta$ is preferred but appreciable benefits are obtained with differences as low as 20°. To facilitate manufacture of the drill head, lateral faces 24 and 26 are substantially planar although there is no requirement that they be planar to obtain the desired cutting action. However, spiral or helical fluted cutting edges are not preferred as they seem to interfere with deburring.

In a new drill head as originally manufactured, lateral faces 24 and 26 extended to forward face 40 of large cylindrical shearing portion 42 of drill head 10 but peripheral facets 36 and 38 terminate somewhat spaced from forward faces 40 so that drill head 10 may be conveniently resharpened merely by regrinding tip facets 16 and 18 and peripheral facets 36 and 38.

Shearing means 44 includes large cylindrical portion 42 followed by reduced portion 46. Cutting edge 48 is formed by the intersection of peripheral surface 50 of large cylindrical portion 42 and annular surface 52. Forward portion 54 of shank 12 is conveniently slightly smaller in diameter than large cylindrical portion 42 of drill head 10 so that inadvertent penetration of the shank into the workpiece will not result in damage to the newly formed hole. While radiusing such as is normal to cutting tool construction may be employed on most of the drill, cutting edge 48 between large cylindrical section 42 and reduced portion 46 should of course, be relatively sharp to obtain optimum shearing action.

In operation, as drill head 10 is advanced into the workpiece, relatively blunt or obtuse tip portion 28 exerts considerable axial force on the workpiece and forms an initial opening which may be surrounded by some degree of surface cracking. Upon further advancement, relatively acute portion 30 begins reaming out the initial hole while exerting forces which tend to have relatively smaller axial components and larger radial and circumferential components. As relatively obtuse tip 28 passes through the opposite side of the workpiece and the reaming portion begins passing out of the hole, localized cracking and breakout near the breakthrough point may result from the axial forces, but this is removed or reduced by the reaming action of section 30 which has a reduced tendency to cause breakout. When large cylindrical portion 42 of drill head 10 passes through the workpiece, hairs left by the drilling action (which may be especially pronounced on the terminal side of the workpiece) are able to spring back into the space left by reduced portion 46. Upon withdrawal of large cylindrical portion 42 through the hole, the hairs are sheared off by cutting edge 48 at the rear of large cylindrical portion 42.

It should be apparent that many modifications may be made to the preferred embodiment described above, while remaining within the invention which is defined solely by the following claims:

As my invention, I claim:

1. A drill for drilling holes in fiber filled composite materials having a shank, a relatively blunt cutting tip portion extending from a forward cutting end of the shank, a relatively acute reaming portion extending rearwardly from an end of the tip portion remote from the cutting end of the shank and a means for shearing fibers including a cylindrical portion of substantially the diameter of the hole to be drilled, and a succeeding diametrically reduced portion, the cylindrical portion extending from an end of the reaming portion most remote from the cutting end and terminating at said succeeding diametrically reduced portion of the shank, the rearwardly facing end of the cylindrical portion forming a full circular rearwardly facing cutting edge symmetrically disposed about a longitudinal axis of the shank and lying in a plane substantially normal to the axis whereby fibers may be sheared off upon retraction of the drill through the hole.

2. A drill as specified in claim 1 wherein the relatively blunt tip portion has a tip angle of between about 60° and 120°.

3. A drill as specified in claim 2 wherein the reaming angle is between 60° and 15°.

4. A drill as specified in claim 2 wherein the reaming angle is substantially 40°.

5. A drill as specified in claim 1 wherein the tip angle is substantially 90°.

6. A drill as specified in claim 1 wherein the tip angle is between 135° and 20°.

7. A drill having:
an elongate shank extending along an axis of the drill;
a substantially planar blade portion at a forward cutting end of the shank, the blade portion having a blunt cutting tip portion terminating at the cutting end and having two peripheral facets defining a tip angle of between about 50° and about 120° and an acute reaming portion extending rearwardly from an end of the tip portion remote from the cutting end and having two planar peripheral facets defining a reaming angle of between about 50° and 15°; and
a cylindrical body portion extending from an end of the reaming portion most remote from the cutting end and terminating at a succeeding diametrically reduced portion of the shank, forming a rearward facing full circular cutting edge symmetrically disposed about the axis of the drill and lying in a plane substantially normal to the axis.

8. A drill as defined in claim 7 having a tip angle of substantially 90° and reaming angle of substantially 40°.

9. A drill for drilling holes in fiber filled composite materials comprising a shank, a drill head coaxial with said shank, said drill head having a rearward coaxial cylindrical portion and a forward coaxial cutting tip portion, a diametrically reduced coaxial portion in said shank, a planar rearwardly facing circular cutting edge formed by said reduced portion and said cylindrical portion.

* * * * *